Oct. 4, 1949.  C. MATARRESE  2,483,472
DEVICE FOR GRINDING AND GRATING FOOD
Filed June 30, 1945  2 Sheets-Sheet 1
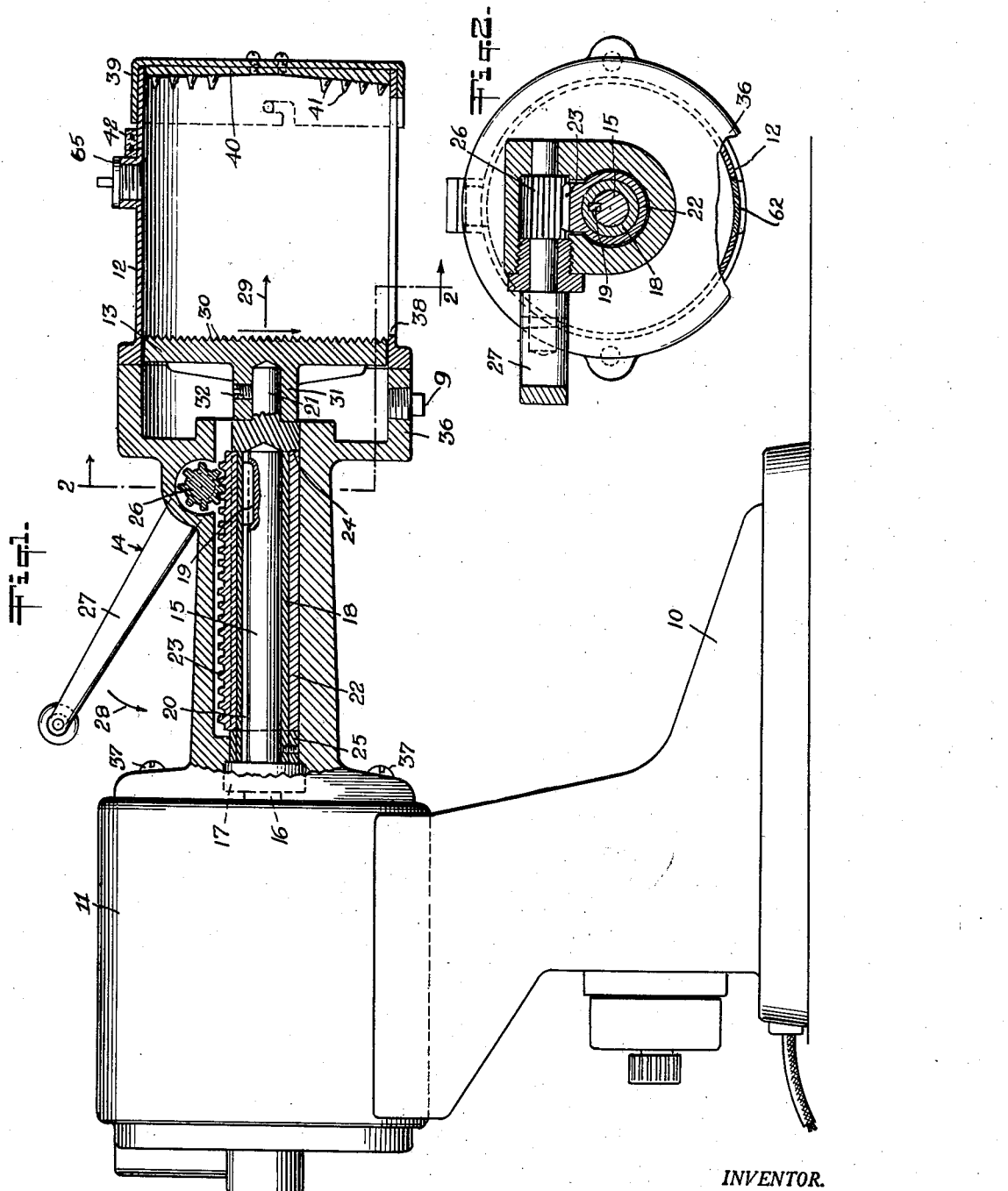
INVENTOR.
Carlo Matarrese
BY
Munn, Liddy & Glaccum
Attorneys

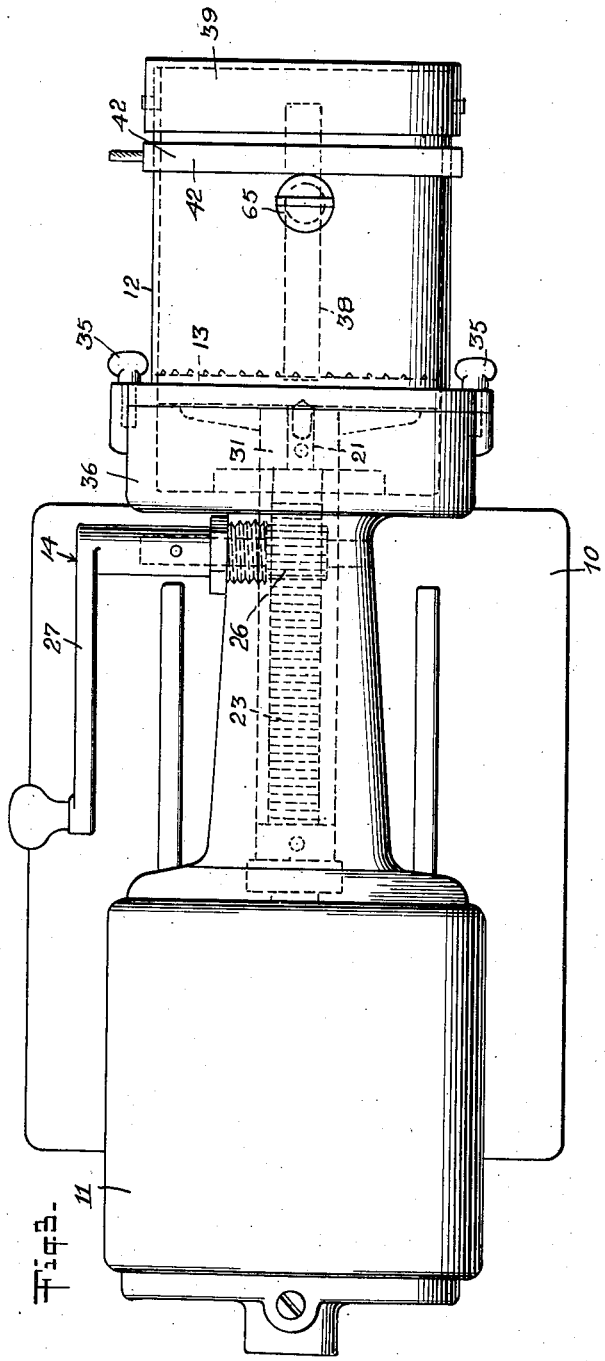

Patented Oct. 4, 1949

2,483,472

UNITED STATES PATENT OFFICE 2,483,472

DEVICE FOR GRINDING AND GRATING FOOD

Carlo Matarrese, Bronx, N. Y.

Application June 30, 1945, Serial No. 602,492

1 Claim. (Cl. 146—108)

The present invention relates to a food preparing machine.

The principal object of the invention is to provide a machine which is capable of preparing the following foods in the following ways:

Grating of cheese, vegetables, bread, fruit rinds, and other foods which may be grated.

Shredding of vegetables and other foods which may be shredded.

Grinding of coffee beans and the like, meats, and similar foods.

Reducing of fruits and vegetables to pulp and juice.

Mashing of cooked potatoes and similar vegetables.

A preferred embodiment of this mechanism is shown in the accompanying drawing in which—

Fig. 1 is a side view of the mechanism as a whole showing its operating parts, exclusive of the electric motor which drives them, in vertical section;

Fig. 2 is a vertical section on the line 2—2 of Fig. 1; and

Fig. 3 is a top view of the device shown in Fig. 1.

Referring now to the drawing, it will be seen that the device herein claimed rests upon a base 10. It includes an electric motor 11, a food chamber 12 in substantially cylindrical form, a cutting element 13 which is rotatably and longitudinally disposed within said chamber, said cutting element being connected to said motor for rotary movement thereof and being connected to an advancing mechanism 14 for longitudinal movement thereof.

It will be seen that a shaft 15 is affixed to the motor shaft 16 by means of a collar or coupling 17. Mounted on said shaft 15 is a slotted sleeve 18, the slot in said sleeve being engaged by a key 19 fixed in said shaft 15. The slot 20 of said sleeve extends longitudinally thereof and the key 19 extends longitudinally of the shaft 15. By reason of this construction it is clear that angular movement of the sleeve relative to the shaft is prevented, whereas longitudinal movement of the sleeve relative to the shaft is permitted. It will also be seen that the sleeve is closed at its forward end and that said end is provided with a stud 21 for a purpose which will hereafter appear.

Sleeve 18 is rotatably mounted within a tubular member 22 having a rack gear 23 formed in its top side. Axial movement of the tubular member relative to the sleeve 18 is prevented by the annular shoulder 24 on the closed end of said sleeve and the collar 25 at the open end of said sleeve. A gear wheel 26 on a fixed axis and controlled by crank 27 meshes with the rack gear 23. It is evident from this construction that when the crank is worked in the direction of the arrow 28 shown in Fig. 1, the rack gear and hence the tubular member 22 of which it is a part and the sleeve member 18 are caused to move longitudinally in the direction of the arrow 29 in said figure. When the crank is worked in the opposite direction, the rack gear, the tubular member and the sleeve are retracted to their original position.

The cutting element 13 is of disc-shape having a roughened or toothed face 30 and a centrally apertured boss 31 on its back. Reference to Fig. 1 will show that the centrally apertured boss 31 is adapted for mounting on the stud 21 of the sleeve 18. A set screw 32 fixes said boss to said stud thereby preventing both axial and angular movement of the cutting element 13 relative to the sleeve 18. It will be noted at this point that rotary movement of the cutting element is caused by the motive power furnished by the motor 11 and that longitudinal movement of said cutting element within the chamber 12 is provided by the crank 27. The motor and the crank function independently of each other; each may be operated alone.

The chamber 12 comprises a substantially cylindrical member which is removably affixed by means of bolts 35 to housing 36 which carries the aforementioned tubular member 22 and gear wheel 26 and which is itself affixed by means of screws 37 to the housing of the motor 11. At the bottom of the cylindrical member which constitutes the chamber 12 is a longitudinal slot 38 whose function will hereinafter appear. At the free end of said cylindrical member 12 is a cap 39 which is removably mounted thereon. Affixed to the inside of said cap and hence on the inside of the cylindrical member 12 is a toothed disc 40, the teeth 41 of said disc facing the toothed face 30 of the cutting element 13. An electric heating element 42 is affixed to the outer surface of the cylindrical member 12 adjacent the cap member 39 mounted thereon.

To illustrate the operation of the machine thus far described, the cap 39 is removed from the cylindrical member 12 and a block of cheese is placed into said cylindrical member. The cap 39 is again mounted on said cylindrical member to close up its forward end. The teeth 41 of the toothed disc 40 on the inside of said cap 39 engage the cheese preventing rotary movement thereof. The motor is started and the cutting element 13 thereby caused to rotate. As it rotates, its toothed face 30 engages the cheese and grates the same. The grated cheese drops through the slot 38 and is collected in the usual manner. To advance the cutting element 13 against the cheese, the crank is worked in the direction designated by the arrow 28. This process continues until all of the cheese is consumed. It will be noted that the cutting element 13 may be advanced in the direction of the toothed disc 40 up to a predetermined point which is just short of the teeth 41 of said disc 40.

The cutting element 13 has been described as having a roughened or toothed face 30. It may be provided with any suitable cutting face to do the work which it is required to do. For example, a face which grates cheese may not very conveniently shred cabbage or grind coffee beans. The disc 13 is, therefore, provided with a face suitable for the purpose for which it is intended to be used. The machine as a whole may be provided with any number of interchangeable discs 13, each having a cutting face suited for a different purpose.

The machine hereinabove described may also be used in another way for the purpose of milling or pulverizing the food to a very fine powder or, if the food is not susceptible of being reduced to a fine powder, to reduce the same to very fine particles and to extrude them from the machine. To prepare the machine for such work a sliding door 62 is inserted into slot 38 for the purpose of closing said slot. Plug 9 behind the cutting member 13 is removed from the threaded hole it normally occupies in housing 36. It will be noted that there is a small space between the perpiheral edge of cutting element 13 and the wall of food chamber 12. This space is necessary to enable the cutting element 13 to rotate in said chamber 12 and also to move longitudinally thereof. In addition to serving this purpose, this space provides passage for the food in the pulverizing or extruding operation under discussion. In the normal operation of the machine, when door 62 does not close opening 38, the grated food falls through said opening and is thereafter collected for storage or use. When opening 38 is closed by door 62, the grated food must find another exit from the food chamber. The only other passage that might therefore be found is the passage provided by the space between the periphery of cutting element 13 and the wall of food chamber 12. Since this clearance is very small the food must necessarily be reduced to very fine proportions before it can make use of said clearance. Such reduction does take place and the food is forced through the space aforementioned to the chamber in back of the cutting element 13 and then out through the hole in housing 36 which is normally closed by plug 9.

The machine above described is but a preferred embodiment of the invention and modifications and variations may be incorporated therein without departing from the basic principles of the invention.

I claim:

A grinding device comprising a cylindrical food chamber having a horizontal axis and an inlet opening for the food at the top thereof and means to close said opening, and a horizontally extending longitudinal slot outlet opening at the bottom thereof and means to close said opening, said chamber having an open end, a removable cover for closing said end, a rotatable and reciprocable imperforate circular disc cutting element having a solid cutting face mounted in said chamber for rotary and longitudinal movement therein, the periphery of the disc closely fitting the walls of said chamber thereby providing a small space between the peripheral edges of the cutting element and the inner wall of the food chamber, said small space constituting a second outlet for the food, grind teeth on the imperforate face of the disc, electric motor, a telescopically extensible connecting means connecting said motor with said cutting element, a housing interconnecting said motor with the food chamber and thereby providing the support for said food chamber and also providing a casing for said telescopically extensible connecting means, an opening formed in the bottom of said housing behind the cutting element and means for closing said last mentioned opening, said opening providing an outlet passage for the food which passes out of the food chamber through the space between the cutting element and the inner wall of said food chamber, and crank-controlled rack and gear means connected to said telescopically extensible connecting means for manually advancing and retracting the cutting element within the food chamber.

CARLO MATARRESE.

REFERENCES CITED

The following references are of record in the file of this patent:

UNITED STATES PATENTS

| Number | Name | Date |
|---|---|---|
| 281,887 | Kimplen | July 24, 1883 |
| 569,250 | Steere | Oct. 13, 1896 |
| 1,512,790 | Muller | Oct. 21, 1924 |
| 2,044,564 | Carter | June 16, 1936 |
| 2,285,721 | Karp | June 9, 1942 |